United States Patent [19]
Sali et al.

[11] Patent Number: 5,544,085
[45] Date of Patent: Aug. 6, 1996

[54] FAST ADDER CHAIN

[75] Inventors: Mauro L. Sali, St. Angelo Lodigiano; Carla Golla, Sesto S.G., both of Italy

[73] Assignee: SGS-Thomson Microelectronics S.r.l., Agrate Brianza, Italy

[21] Appl. No.: 309,793

[22] Filed: Sep. 21, 1994

Related U.S. Application Data

[63] Continuation of Ser. No. 68,115, May 25, 1993, abandoned.

[30] Foreign Application Priority Data

May 27, 1992 [EP] European Pat. Off. .............. 92830267

[51] Int. Cl.[6] ....................................................... G06F 7/50
[52] U.S. Cl. ............................................................ 364/787
[58] Field of Search ................................... 364/784–788

[56] References Cited

U.S. PATENT DOCUMENTS 3,925,651  12/1975  Miller ................................. 364/787 X
5,113,362   5/1992  Harston et al. ....................... 364/786 X

FOREIGN PATENT DOCUMENTS 0391516  10/1990  European Pat. Off. .

OTHER PUBLICATIONS

IEEE Proceedings G. Electronic Circuits & Systems, vol 133, No. 5, Oct. 1986, Stevenage GB, pp. 256–264, H. Yung et al., "Recursive Addition and Its Parameterisation in VSLI".

Proceedings of the 1990 IEEE International Symposium on Circuits and Systems, 1–3 May, 1990, New Orleans, LA, USA, vol. 2, IEEE, New York, USA, pp. 982–986, T. Noll, "Carry–Save Arithmetic for High–Speed Digital Signal Processing".

IEEE Journal of Solid State Circuits, vol. 23, No. 2, Apr. 1988, New York, US, pp. 573–580, C. Ekroot, "A GaAs 4–Bit Adder–Accumulator Circuit for Direct Digital Synthesis".

Beraud et al., "High speed Accumulator", IBM Tech. Discl. Bull. vol. 17, No. 1, Jun. 1974, pp. 118–119.

Clocksin, "Automatic Specialisation of Standard Design", Computer Journal, vol. 29, No. 6, Dec. 1986, London GB, pp. 495–499.

Kwang, "Computer Arithmetic", Wiley & Sons, New York, US., 1979, pp. 40–43.

*Primary Examiner*—Tan V. Mai
*Attorney, Agent, or Firm*—David M. Driscoll; James H. Morris; Randy J. Pritzker

[57] ABSTRACT

A fast adder chain for adding together at least one pair of digital words and including a plurality of cascaded adder blocks. Each block having computation adders for obtaining the pseudosum of said pair of digital words and latches for storing and transmitting the pseudosum to the next block and the pseudocarry from the computation to the chain end.

20 Claims, 4 Drawing Sheets

FAST ADDER CHAIN

This application is a continuation of application Ser. No. 08/068,115, filed May 25, 1993, abandoned.

BACKGROUND OF THE INVENTION

1. Field of the Invention

This invention relates to a fast adder chain. More particularly, the invention relates to an adder chain operable to add together at least one pair of digital words and including a plurality of adder blocks in cascade.

2. Discussion of the Related Art

As is well known, adder chains are used in a variety of circuit arrangements designed to meet a range of different applicational demands. A typical example of their application is related to FIR (Finite Impulse Response) filters, wherein the adders are adapted to implement part of the transfer function which is characteristic of the filter. A number of proposals have been known in the art which are directed to provide adder chains. Such prior proposals include a common drawback in that they are all quite slow in yielding the result of the sum operation. Some of these prior approaches have been described in detail in Joseph Cavanagh's "Digital Computer Arithmetics", published by McGraw-Hill.

For completeness of discussion, briefly reviewed herein below are the most commonly adopted solutions to the problem of providing N-bit parallel adders for two's complement, fixed point numbers. A first adder is known as the "Look-Ahead Carry" type and is effective to simultaneously input carries to each block at the location of each bit. The carries are generated from three count levels, whereas the sum is obtained from two levels.

It follows that the maximum propagation delay will be equal to five clock impulses. However, the final carry requires a logic AND gate with N+1 inputs, which can only be implemented by a network of cascade-connnected gates. It should be appreciated that this involves an additional delay in the signal propagation.

Another adder, known as the "Select Carry" type, has a structure whereby the operands are divided into groups, and each group is implemented using the same logic as in the first adder described above. This second adder is not so fast, and requires highly complex circuitry.

A third prior approach, referred to as the "By-Pass Carry", attempts to reduce the time required to generate the sum by speeding up the carry determining operation for the carry to be input to a given cell. For this purpose, an overriding step is provided for the carry to override one chain stage when either operand already has a logic value of one at the given location. The attainable rate with this approach is not a significantly fast one.

Another type of adder is that known in the art as "Carry Save Adder" or "pseudoadder", and includes a combination network which, when input three numbers of N bits each, will output two more N-bit numbers referred to as the "pseudosum" and "pseudocarry". This prior art adder requires, however, a final stage to add the pseudosum and pseudocarry together, with the pseudocarry suitably shifted one position.

In summary, all of the state-of-art proposals have the disadvantage of being quite slow in performing the sum operation despite the different forms in which they have been embodied. Further, they imply considerable circuit complexity.

The underlying technical problem of this invention is to provide an adder chain which has such structural and functional characteristics so as to allow the sum operation to be performed at a very fast rate, well beyond the limits of current like arrangements.

SUMMARY OF THE INVENTION

The invention includes propagating the carry only once to the end of the adder chain. Based on the invention, the technical problem is solved by an adder chain including a plurality of adder blocks connected in cascade. Each adder block includes a plurality of adder elements, each adder element receiving like weighted bits of the first and second digital words and computing a pseudosum and a pseudocarry of the like weighted bits. Storage elements, coupled to the adder elements, store the pseudosums and pseudocarries. Transmitting elements, coupled to the storage elements, transmit the pseudosums and pseudocarries.

BRIEF DESCRIPTION OF THE DRAWINGS

Other features and the advantages of an adder chain according to the invention will become apparent from the following detailed description of an embodiment thereof, given by way of a non-limitative example with reference to the accompanying drawings.

In the drawings.

DETAILED DESCRIPTION

Figure 1:
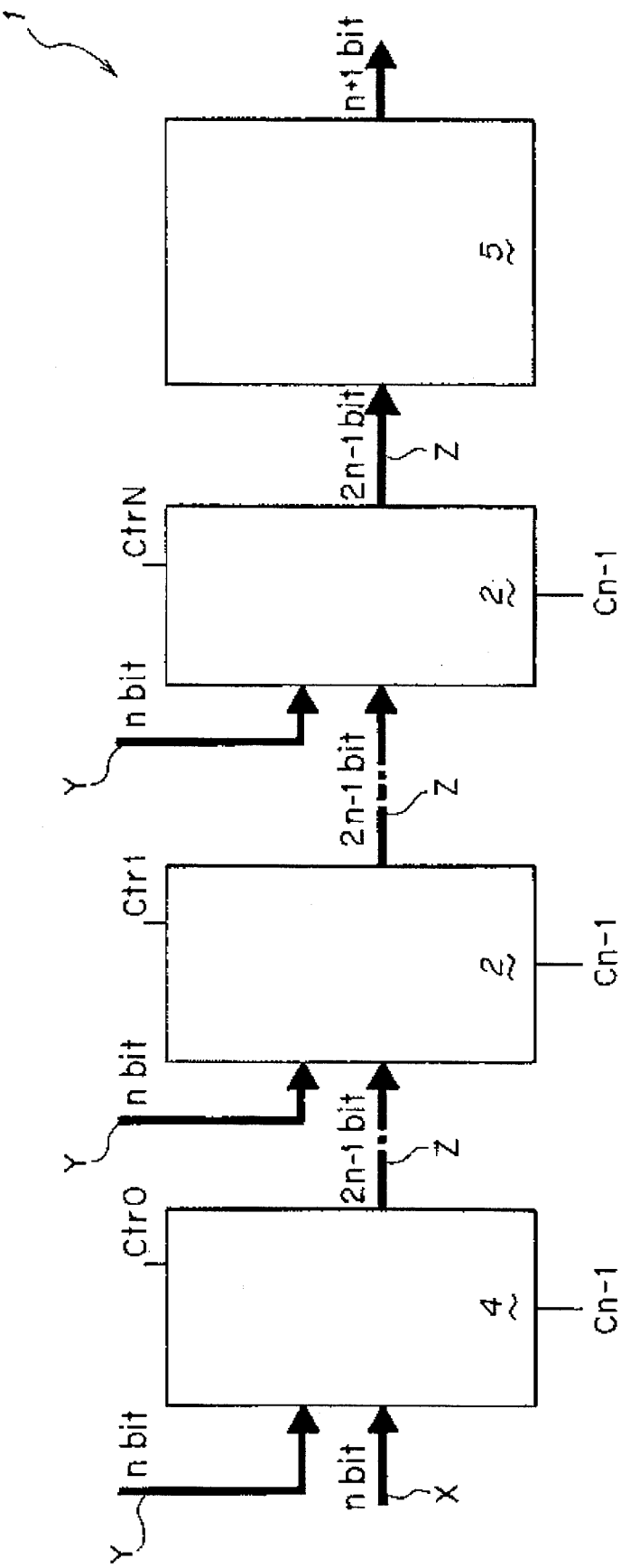
FIG. 1 is a block diagram of an adder chain embodying the invention.

With reference to the drawing views, generally and schematically shown at 1 is an adder chain embodying this invention. This chain 1 is particularly, though not solely, intended for incorporation into a digital filter of the conventional FIR type, not shown. The chain 1 structure includes a plurality of N adder or sum blocks 2 located centrally therein, which correspond in number to the number of words to be added. Also provided are an initial block 4 and an end block 5 for computing and presenting the sum in explicit form. The adder blocks are connected in cascade in which an initial adder block 4 has an output Z connected to an input of a subsequent adder block Z. The subsequent adder block Z has an output Z connected to an input of a further subsequent block 2; and so on up to and including the connection of final block 5.

Figure 2:
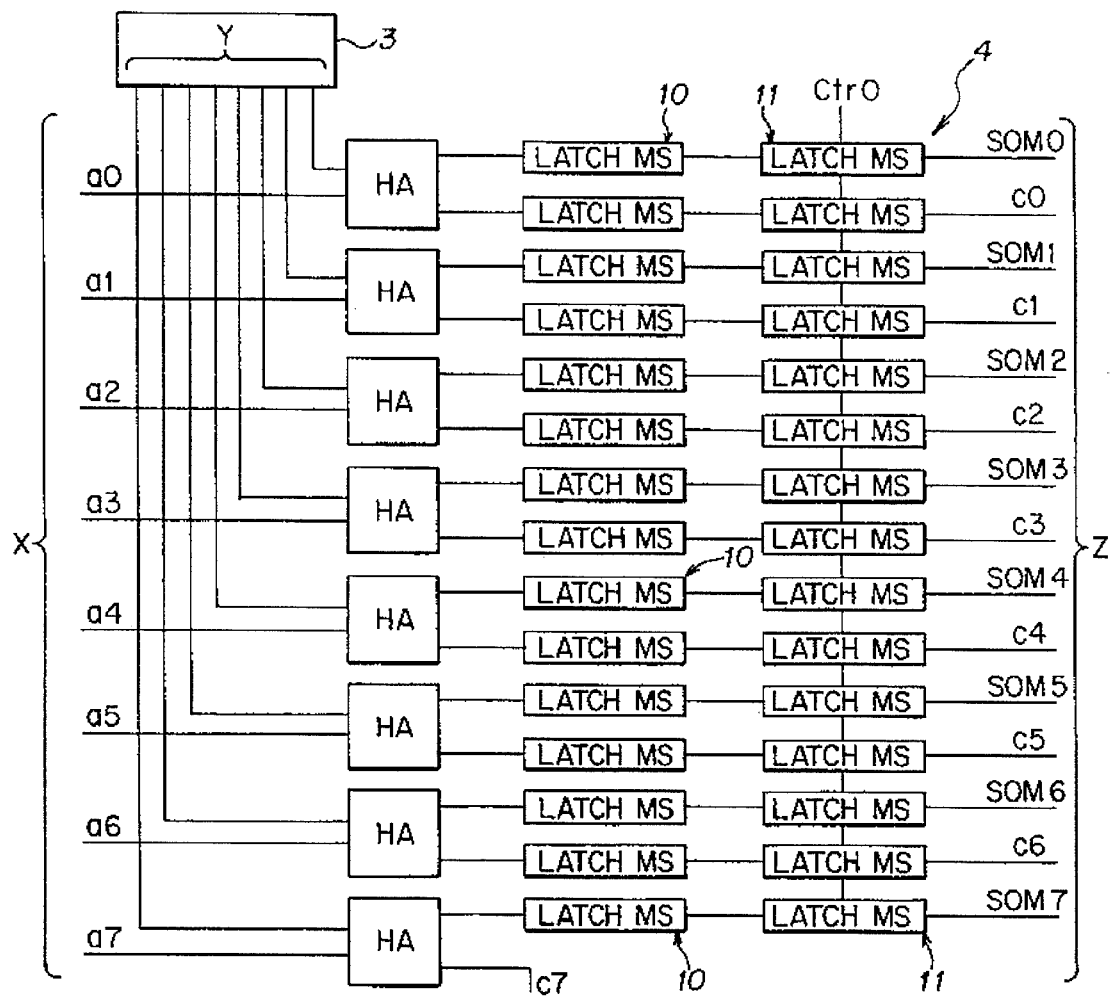
FIG. 2 shows diagrammatically a detail of a first adder or sum block in the chain of FIG. 1.

The initial block 4 is shown in FIG. 2 to include at least n elemental adders HA of the so-called half-adder type, being each effective to perform the sum of two homolog digits (bits) of two digital words. In the exemplary embodiment under consideration, the words to be added are composed of n=8 bits each. The block 4 includes n adders HA arranged in parallel, being each provided with two inputs for receiving the corresponding digital signals to the aforesaid digits to be added together. Each adder HA will therefore be input: a digital signal ai which corresponds to a bit of a first digital word X; and a second digital signal bi which corresponds to a digit of a second word Y to be added to the first. It is, of course, understood that the two digits will occupy the same position in their respective digital words X and Y. The second signal is provided from a register, indicated at 3, which contains the word Y. The word X is instead utilized to allow a number of digital filters included within the chain to be cascade connected to one another, as described above.

Figure 4:
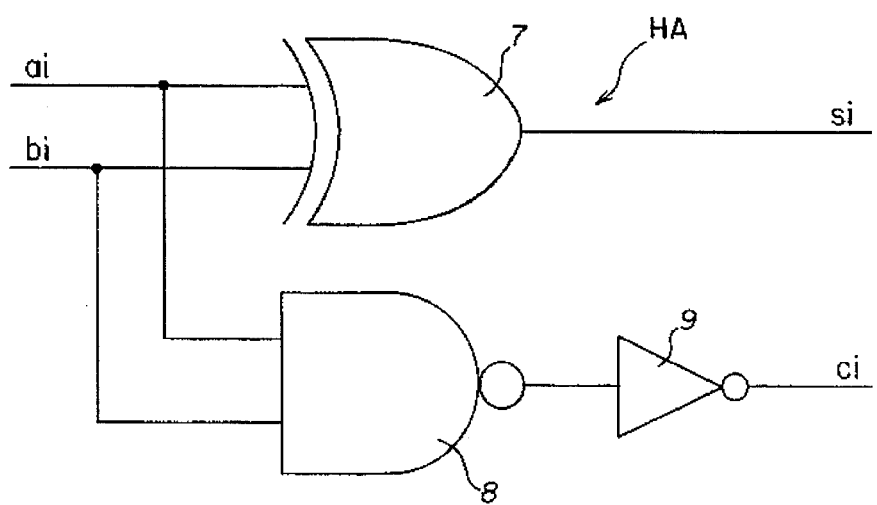
FIG. 4 shows an embodiment of an elemental adder incorporated in the blocks in FIGS. 2 and 3.

Advantageously, the construction of each adder HA includes simple logic gates, as shown in FIG. 4. A first gate 7 of the exclusive OR (XOR) type receives both inputs ai and bi, and outputs a result designated si. Another logic gate of the negated AND (NAND) type receives, in turn, the inputs ai and bi, and outputs a result ci through an inverter 9. In essence, the simple circuit that embodies the adder HA will implement the following boolean logic equations:

$$si = ai \text{ XOR } bi$$

$$ci = ai \text{ AND } bi$$

where ai and bi are the bits to be added together, and si and ci are the sum and carry, respectively, of the i-th operation. The construction of the initial block 4 also includes a plurality of latches 10. More specifically, these latches are of the master-slave type and are provided in the number of (2n-1). In fact, a latch 10 is provided after each output si or ci from the adders HA, except the output Cn-1 of the last adder in the block 4. This output represents, in fact, the n-th carry and should be cleared to allow the carry to be shifted one place toward the most significant bits in order for the result to be correct. A similar set of 2n-1 memories 11, also of the master-slave type, is arranged after the previous latches 10 to receive the outputs thereof. These memories 11 are dual selection latches activated by a control signal Ctro which can enable the input signal to override a latch. The latches 11 are provided to realize linear phase symmetrical FIR filters. The latch 11 outputs have been designated SOMi or ci in FIG. 2, depending on whether they relate to the i-th bit of pseudosum or pseudocarry in the operation performed in block 4.

Figure 3:
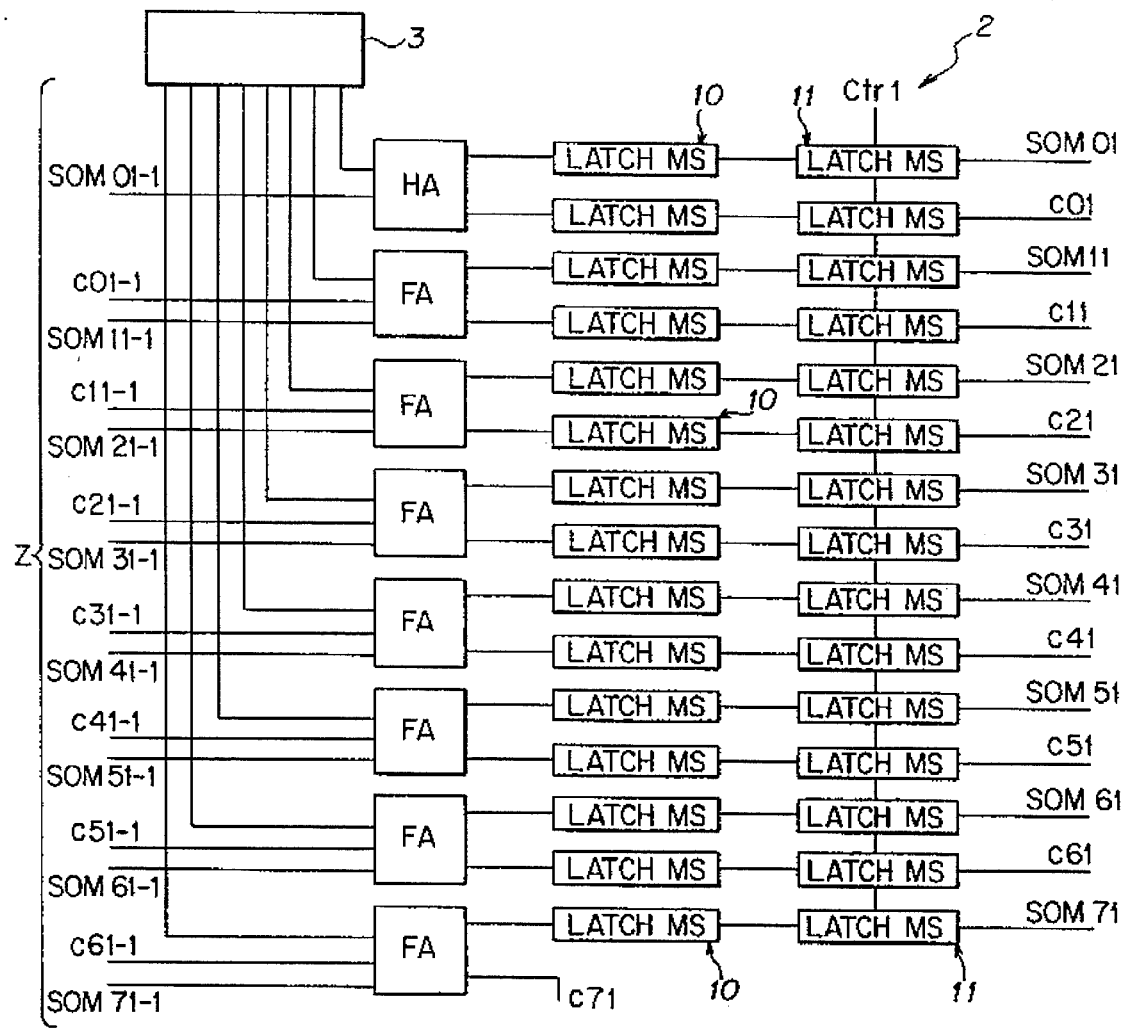
FIG. 3 shows a diagrammatic detail representation of a generic i-th adder or sum block of the chain of FIG. 1.

The construction of the N blocks 2 positioned centrally in the chain 1 will be next discussed in detail with specific reference to FIG. 3. Each i-th block 2 is input a digital word Y of n bits from memory 3, and the digital output Z from the preceding adder block. This output Z will comprise 2n-1 bits. Each block 2 includes at least one adder HA of the half-adder type and a plurality of adders FA of the full-adder type; the latter are operative to add together two bits and one carry being input thereto.

Figure 5:
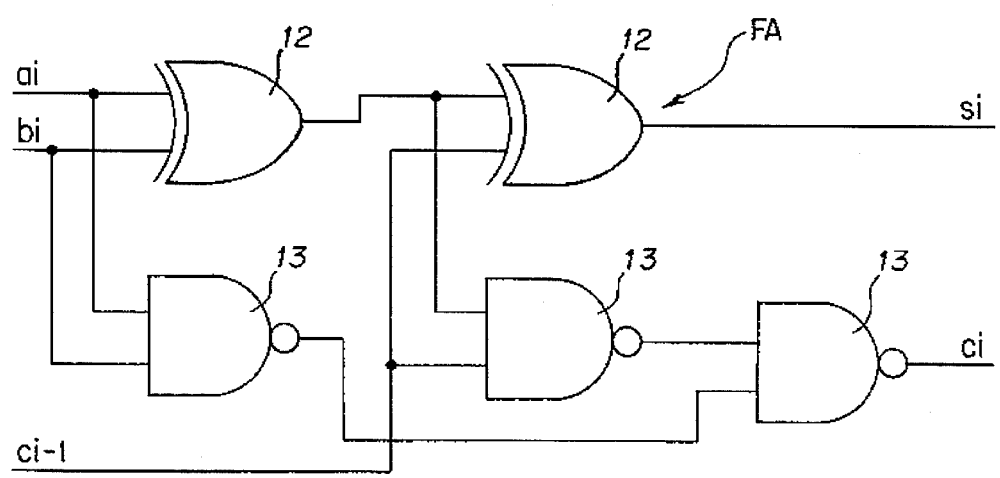
FIG. 5 shows another embodiment of an elemental adder incorporated in the blocks in FIGS. 2 and 3.

Shown in FIG. 5 is an embodiment of a full adder FA implemented to the specifications of this invention. This adder FA comprises a first logic gate 12 of the exclusive OR (XOR) type which is input the digital signals corresponding to generic homolog bits ai and bi to be added together. The output of this first XOR gate is connected to an input of a second logic gate 12 of the XOR type which also receives the signal ci-1 corresponding to the carry of the sum operation performed on the immediately preceding position bits. The output of the second XOR gate constitutes the result si of the sum operation on the above-mentioned three bits. The adder FA further includes a first logic gate 13 of the negated AND (NAND) type which is input, in turn, the-bits ai and bi. A second NAND gate 13 receives the output from the first XOR gate 12 and the carry signal ci-1. The respective outputs from the first and second gates 13 are input to a third NAND gate 13 whose output represents the carry ci from the i-th sum operation performed. In summary, the structure shown in FIG. 5 will implement the following boolean logic equations:

$$si = ai \text{ XOR } bi \text{ XOR } ci\text{-}1$$

$$ci = (ai \text{ NAND } bi) \text{ NAND } [(ai \text{ XOR } bi) \text{ NAND } ci\text{-}1]$$

where ci-1 is the carry input to the adder FA.

In a similar way to block 4, each block 2 includes latches 10 provided after each output of the adders HA or FA, except for the output of the carry Cn-1 related to the last adder FA.

Additional dual selection latches 11, controlled by a control signal Ctri, are cascade connected to the previously described latches 10, to serve functions that will be explained herein below.

Figure 6:
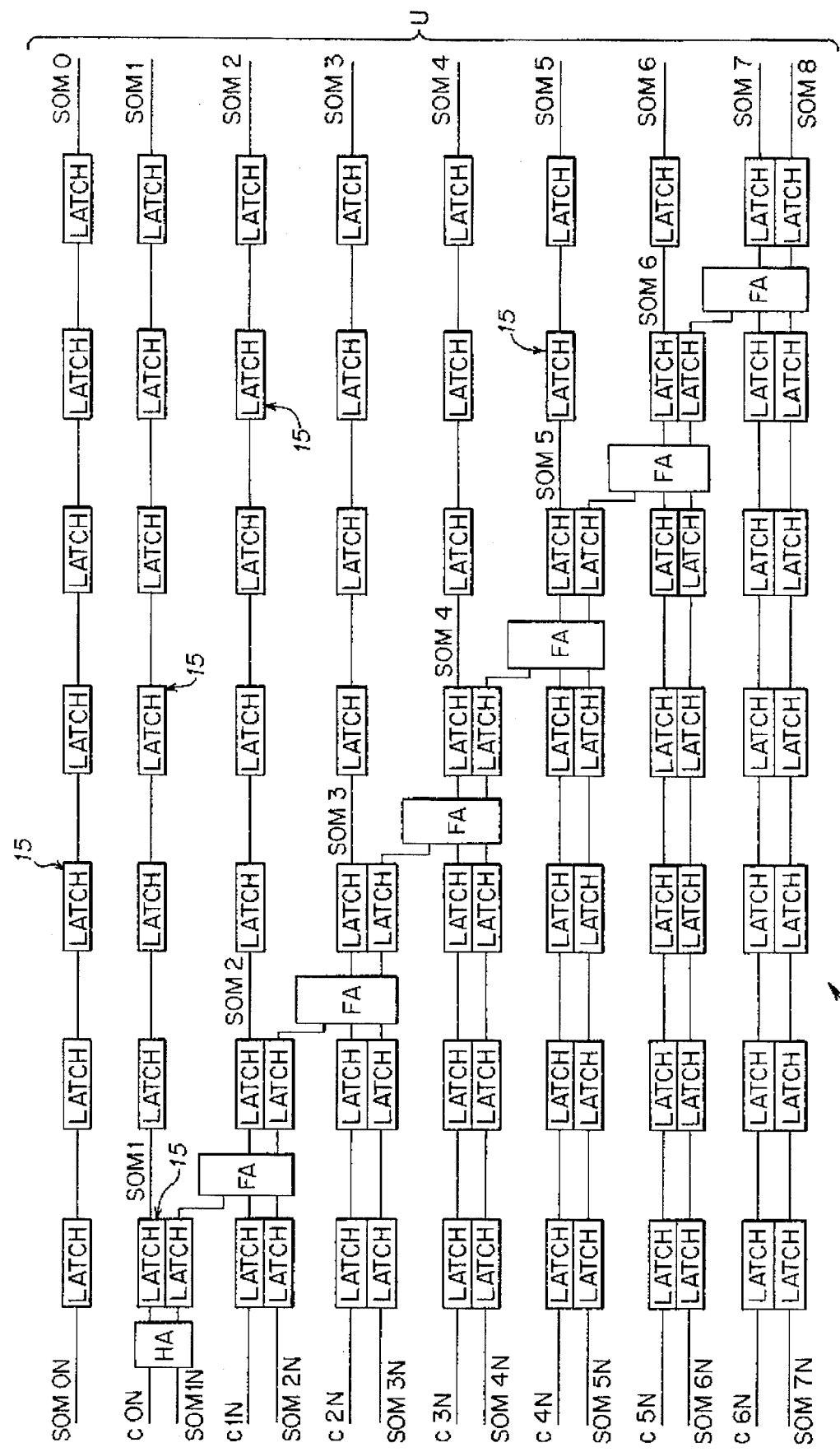
FIG. 6 is a diagrammatic representation of an end block in the chain of FIG. 1.

The structure of the end block 5 remains to be described which is to perform and present, on an output U, the explicit computation of the digital word sum. As shown in FIG. 6, the block 5 basically includes a plurality of latches 15 which are orderly arranged in cascade along parallel rows. There are 2n-1 rows. The first row only includes latches 15 and carries on its output the value SOMON of the least significant bit of the pseudosum computed in the last block. The second and third rows include alternately a half adder HA which is input the second pseudosum bit and the first pseudocarry bit. The two outputs of this half adder are connected to two respective latches 15, of which the first contains the second bit of the result of the sum operation to be carried over to the output U, and the second contains the second carry to be applied to a following adder of the FA or full-adder type.

Regarding the remaining rows, the block 5 has paired rows including a full adder FA whose position is shifted one place at each double row so as to be input the carry on the output of the FA adder directly preceding it. In summary, the carry is propagated one position at each clock pulse, and each bit of the final or partial sum and each carry are stored in the master-slave latches 15.

The operation of the adder chain according to the invention will be further described. The scanning rate of the transactions which take place within the circuit is set by a clock signal. A major advantage of the invention is that the carry from an elemental sum operation, i.e. an operation performed on two bits only of the words to be added together, is propagated once to the end of the chain, ahead of the output. The internal logic of the adder blocks 2 uses the pseudosum SOMi and pseudocarry ci for data. For example, if the binary number 101011 is to be added to a binary number 110000, then the result can be expressed by a pseudosum 011011 and an associated so-called pseudocarry 100000. The latter should be shifted one place toward the most significant encoding digits or bits. A generic i-th block 2 will, therefore, receive three words: the pseudosum SOMi, pseudocarry ci, and output word from memory 3. The end block 5 will instead shift the pseudocarry one place toward the most significant bits of the pseudosum, in accordance with the circuit overall timing.

The carry from each elemental summing operation performed on two bits is propagated at each clock pulse. Each bit in the partial sum and each carry will be stored in the master-slave latches 10 and 11. In some cases, particularly where the chain 1 is used in linear digital filters, the dual selection latches 11 may be overridden under control of the control signal Ctri.

The chain 1 of this invention poses no operational rate problems because of the time required for an FA adder to complete the sum of two bits and the input carry being approximately 3–4 nsec; while the time required for a latch 10 to store the result of the operation is about 3 nsec. Accordingly, the overall delay will be 6–7 nsec, that is one half of the time required by current approaches.

Thus, the adder chain of this invention has shown to be specially effective in operation at the highest rates anticipated for conventional digital filters. Furthermore, it can be implemented using very simple and highly reliable basic elements.

We claim:

1. An adder chain for adding together at least first and second digital words and providing a sum, comprising:

a plurality of adder blocks connected in cascade, a first adder block including:

a plurality of adder elements, each adder element receiving like weighted bits of the first and second digital words and computing a pseudosum and pseudocarry of the like weighted bits;

storage elements, coupled to the adder elements, receiving the pseudosums and the pseudocarries, and storing the pseudosums and the pseudocarries; and transmitting elements, coupled to the storage elements, receiving the pseudosums and the pseudocarries, and transmitting the pseudosums and the pseudocarries to a subsequent adder block; and a last adder block including:

a plurality of adding elements, wherein each of the adding elements except for a first adding element receives a pseudosum bit and a pseudocarry bit from a preceding adder block and a carry bit from an immediately preceding adding element, and provides a carry bit to a subsequent adding element and a sum bit which is part of the sum.

2. The adder chain as claimed in claim 1 wherein the adder elements of the first adder block include a plurality of half-adders and the adder elements of the last adder block include at least one half-adder and a plurality of full-adders.

3. An adder chain as claimed in claim 2 wherein the adder blocks include a first block including a number of half-adders greater than or equal to a number of bits in the first and second digital words.

4. An adder chain as claimed in claim 3 wherein at least one adder includes an exclusive OR gate and an AND gate, each of said gates receiving like weighted bits of the first and second digital words.

5. An adder chain as claimed in claim 4 wherein the AND gate includes a NAND gate and an inverter connected in cascade.

6. An adder chain as claimed in claim 2 wherein at least one adder includes:

first and second exclusive OR gates connected in cascade, the first exclusive OR gate receiving like weighted bits of the first and second digital words; and a plurality of NAND gates coupled to the first and second exclusive OR gates.

7. An adder chain as claimed in claim 2 wherein at least one adder implements boolean logic according to:

$$si = ai \text{ XOR } bi \text{ [Xor] XOR } ci\text{-}1; \text{ and}$$

$$ci = (ai \text{ NAND } bi) \text{ NAND } \{(ai \text{ XOR } bi) \text{ NAND } ci\text{-}1\}$$

where ai and bi are like weighted bits of the first and second digital words, respectively, ci-1 is a carry input to an adder, si is a pseudosum, and ci is a pseudocarry.

8. An adder chain as claimed in claim 1 wherein the adder blocks include a last block receiving pseudosums and pseudocarries from a previous block, the last block including:

a number of rows of storage elements connected in cascade, the number of rows equal to a number of bits in the first and second digital words; and a least one adder element coupled to storage elements in all rows but a first row.

9. An adder chain as claimed in claim 8 wherein the last block includes at least one half-adder coupled to storage elements in at least one row, and a plurality of half-adders coupled to storage elements in a plurality of rows.

10. An adder chain comprising:

a plurality of adder blocks connected in cascade, a first of the adder blocks receiving at least first and second digital words to be added together, the first adder block including:

a plurality of adder elements, each adder element receiving like weighted bits of the first and second digital words and computing a pseudosum and a pseudocarry of the like weighted bits;

storage elements, coupled to the adder elements, receiving the pseudosums and the pseudocarries, and storing the pseudosums and the pseudocarries; and transmitting elements, coupled to the storage elements, receiving the pseudosums and the pseudocarries, and transmitting the pseudosums and pseudocarries to a subsequent adder block; and a last adder block including:

a plurality of adding elements, wherein each of the adding elements except for a first adding element receives a pseudosum bit and a pseudocarry bit from a preceding adder block and a carry bit from an immediately preceding adding element, and provides a carry bit to a subsequent adding element and a sum bit which is part of a sum of the first and second digital words.

11. The adder chain as claimed in claim 10 wherein the adder elements of the first adder block include a plurality of the half-adders and the adder elements of the laster adder block include at least one half-adder and a plurality of full-adders.

12. An adder chain as claimed in claim 11 wherein the adder blocks include a first block including a number of half-adders greater than or equal to a number of bits in the first and second digital words.

13. An adder chain as claimed in claim 12 wherein at least one adder includes an exclusive OR gate and an AND gate, each of said gates receiving like weighted bits of the first and second digital words.

14. An adder chain as claimed in claim 13 wherein the AND gate includes a NAND gate and an inverter connected in cascade.

15. An adder chain as claimed in claim 11 wherein at least one adder includes:

first and second exclusive OR gates connected in cascade, the first exclusive OR gate receiving like weighted bits of the first and second digital word; and a plurality of NAND gates coupled to the first and second exclusive OR gates.

16. An adder chain as claimed in claim 11 wherein at least one adder implements boolean logic according to:

$$si = ai \text{ XOR } bi \text{ XOR } ci\text{-}1; \text{ and}$$

$c_i = (a_i \text{ NAND } b_i) \text{ NAND } \{(a_i \text{ XOR } b_i) \text{ NAND } c_{i-1}\}$, where ai and bi are like weighted bits of the first and second digital words, ci-1 is a carry input to an adder, si is a pseudosum, and ci is a pseudocarry.

17. An adder chain as claimed in claim 10 wherein the adder blocks include a last block receiving pseudosums and pseudocarries from a previous block, the last block including:
   a number of rows of storage elements connected in cascade, the number of rows equal to a number of bits in the first and second digital words; and
   a least one adder element coupled to storage elements in all rows but a first row.

18. An adder chain as claimed in claim 17 wherein the last block includes at least one half-adder coupled to storage elements in at least one row, and a plurality of half-adders coupled to storage elements in a plurality of rows.

19. An adder chain comprising:
   a plurality of adder blocks connected in cascade, a first of the adder blocks receiving at least first and second digital words to be added together, the first adder block comprising:
   a plurality of means for receiving like weighted bits of the first and second digital words and computing a pseudosum and a pseudocarry of the like weighted bits;
   a plurality of means, coupled to the means for computing, for receiving the pseudosums and the pseudocarries and storing the pseudosums and the pseudocarries;
   a plurality of means, coupled to the means for storing, for receiving the pseudosums and pseudocarries and transmitting the pseudosums and pseudocarries to a subsequent adder block; and
   a last adder including:
   a plurality of adding means, each of the adding means except for a first adding means receiving a pseudosum bit and a pseudocarry bit from a preceding adder block and a carry bit from an immediately preceding adding means, for adding the pseudosum bit, the pseudocarry bit and the carry bit and producing a carry bit to a subsequent adding means and a sum bit.

20. A method of adding at least first and second digital words to produce a sum comprising the steps of:
   providing a plurality of adder blocks connected in cascade, a first adder block to receive the first and second digital words;
   using adder elements within at least one adder block to compute a pseudosum and a pseudocarry for each like weighted bit of the first and second digital words;
   storing the pseudosums and the pseudocarries;
   selectively transmitting the pseudosums and the pseudocarries from the at least one adder block to a subsequent adder block;
   providing a plurality of adding elements in a last adder block;
   with each adding element of the last adder block, except for a first adding element, receiving a pseudosum bit and a pseudocarry bit from a preceding adder block and a carry bit from an immediately preceding adding element, and providing a carry bit to a subsequent adding element and a sum bit which is part of a sum of the first and second digital words.

\* \* \* \* \*